Patented Dec. 14, 1943

2,336,598

UNITED STATES PATENT OFFICE 2,336,598

STABILIZATION OF ORGANIC SUBSTANCES

Frederick B. Downing and Charles J. Pedersen, Penns Grove, N. J., assignors to E. I. du Pont de Nemours & Company, Wilmington, Del., a corporation of Delaware No Drawing. Application November 3, 1939, Serial No. 302,712

36 Claims. (Cl. 44—73)

This invention relates to the stabilization of organic substances, and particularly to the protection of organic substances against the deleterious action of oxygen catalyzed by the presence of copper and its compounds, and more particularly to the preservation of oxidizable mineral hydrocarbons containing or in contact with copper and its compounds.

Oxidation reactions, which are initiated or modified by the presence of a catalyst, may be conveniently divided into two classes:

(1) Those caused by molecular oxygen, and
(2) Those caused by oxidizing agents.

Reactions of the first class occur continuously and spontaneously because oxygen is ubiquitous. In the following discussion, the term "oxidation" refers only to those reactions involving molecular oxygen including, however the intermediate compounds formed which are capable of effecting further oxidation.

Many organic products, such as fats, edible oils, vegetable juices, textile fibres, petroleum products, rubber, photographic developers and synthetic unsaturated compounds, are readily attacked by oxygen and the resulting deterioration, whether due to the accumulation of oxidation products or to disaggregation or polymerization induced by the primary oxidation products, imparts undesirable qualities to them and eventually destroys their usefulness.

The oxidation of these products is promoted by:

(1) Autogenous catalysts formed by the oxidation of the products themselves, and
(2) Extraneous catalysts which are accidentally present in the products.

The autogenous catalysts, generally considered to be peroxides or moloxides, functioning through the mechanism of branch-chain-reaction, are responsible for the phenomenon termed "auto-oxidation," wherein the reaction proceeds very slowly at first but gradually accelerates until a maximum is reached. The initial period of negligible reaction rate is called the induction period. Since these catalysts are integral constituents of the oxidation system, the particular process of oxidation cannot occur in their absence, and, being derivatives of the products, they are variable and possess different chemical properties.

On the other hand, the extraneous catalysts, restricted in this discussion to copper and its compounds, do not occur of necessity in any organic product which is not a derivative of copper, although they may be accidentally present in any product. The catalytic activity of copper is inherent and is possessed by it in any medium unless the activity has been modified or suppressed by chemical means.

It has been found that certain compounds, known as antioxidants, retard the purely auto-catalytic process, while some compounds, herein named copper deactivators, suppress the catalytic activity of copper and its compounds. The nature and the action of antioxidants and copper deactivators will be described below, but, without further discussion, it may be concluded from the facts presented above that antioxidants must be specific with respect to the oxidizable organic product and that deactivators must be specific for copper and independent of the medium. Certain factors, however, such as very low pH and insolubility, will determine whether a given deactivator can or cannot be used in a particular system.

Signal success has been achieved in recent years in the preservation of many organic products by the discovery and use of compounds generally called "oxidation inhibitors" or "antioxidants." These agents, mostly oxidizable organic compounds, retard the auto-catalytic process. Since antioxidants are themselves oxidizable, the beneficial effect obtained by their use is not permanent, and they protect the organic products only so long as they are not rendered inactive. They are, moreover, very specific in action, each group of auto-oxidizable products requiring a different type of antioxidant for the best results.

Copper and its salts accelerate the oxidation of many organic substances, including most of the antioxidants. It is well known that copper promotes the formation of gum in gasoline, and speeds up the aging of rubber and the development of rancidity in fats and oils. Hence, copper and antioxidants are antagonistic in action, and the normal inhibiting effect of the latter is greatly reduced in the presence of the former.

Copper occurs naturally in many organic products, but usually in such slight traces as to cause very little harm. The concentration of copper, however, is frequently raised during the course of handling and utilizing the products: vessels and conduits made of metals containing copper are used for storage and transportation; ingredients contaminated with copper might be added; copper might actually be required in one of the steps in the process for manufacture as in the copper sweetening of gasoline.

The harm done by copper and its salts may be prevented by at least three methods:

(1) The removal of copper by purification, but often this is impossible of accomplishment and usually too costly to be economically feasible,
(2) The addition of a sufficient amount of an antioxidant so that its preserving effect is equal to or greater than the prooxidant effect of the copper present, but, as will be shown later, the antioxidant efficiency is so greatly diminished by the copper that the advantage gained under this circumstance is seldom worth the cost of the increased quantity of antioxidant required for adequate stabilization, and
(3) The suppression of the catalytic activity of copper by chemical means without physically removing the copper from the system.

Compounds, capable of effectively suppressing the catalytic activity of copper and its salts, have been found and have been named copper deactivators. Their use in the preservation of organic products containing or in contact with copper and its salts through methods (3), and (3) in combination with (2) is the object of this invention.

While the so-called "antioxidants" are specific to the type of organic substance, it has been found that copper deactivators are specific for copper and its compounds and are independent of the organic substance. In so far as the organic substance to be stabilized is concerned, the only requirements are that the copper deactivator be soluble therein and that the organic substance be not strongly acid so as to destroy the copper deactivator compound.

An object of the present invention is to retard the deterioration of organic substances caused by the action of molecular oxygen and promoted by the presence of copper and its compounds. Another object is to provide a class of organic compounds which, when added to an organic substance normally subject to deterioration by oxygen in the presence of copper and its compounds, will suppress the activity of the copper or its compounds. A further object is to provide a method for rendering antioxidants more effective for the preservation of organic substances in the presence of copper and its compounds. A still further object is to provide a class of organic compounds which, when added to an organic substance in the presence of an antioxidant and in the presence of copper or its compounds, increases the efficiency of the antioxidant. Still further objects are to inhibit the formation of color, acids, gum, sludge and the like in liquid petroleum hydrocarbons containing or in contact with copper or its compounds. Other objects are to provide new compositions of matter and to advance the art. Still other objects will appear hereinafter.

The above and other objects may be accomplished in accordance with our invention which comprises incorporating, in organic substances which are subject to deterioration normally caused by oxygen in the presence of copper and its compounds, organic compounds of the type of a 2-hydroxy aromatic oxime compound. By "oxime compound," we mean compounds containing the group

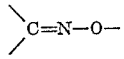

Our compounds may be represented by the formula

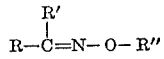

wherein R represents an ortho-hydroxy substituted aromatic radical, R' represents hydrogen or an organic radical and R" represents hydrogen or an organic radical. Each of R, R' and R" may contain substituents such as alkyl, aryl, alkoxy, aryloxy, hydroxy, halogen, nitro, cyano, carboxyl and amino groups, but should be free of strongly acid groups, such as sulfuric and sulfonic acid groups.

Accordingly, within the broad scope of our invention, we intend to include the ethers and organic esters of the oximes, wherein R" is an organic group, as well as the free oximes. However the free oximes, that is, those in which R" represents hydrogen, are preferred. Also, while each of R, R' and R" may contain substituents as indicated above, preferably, R represents a 2-hydroxy aryl group, that is, one that, except for the 2-hydroxy group, consists of carbon and hydrogen, R' represents hydrogen or a hydrocarbon group and preferably a lower alkyl group of 1 to 6 carbon atoms and preferably hydrogen. In other words, our preferred compounds are the unsubstituted 2-hydroxy aryl oximes, "unsubstituted" meaning containing no substituents other than hydrocarbon groups. Further, the aromatic and aryl groups are preferably of the benzene series, that is, contain only one benzene ring. Therefore, our preferred compounds are the 2-hydroxy aromatic aldoximes and 2-hydroxy aromatic ketoximes and, particularly, the 2-hydroxy aryl aldoximes and 2-hydroxy aryl ketoximes, and, still more particularly, the 2-hydroxy benzaldoximes and 2-hydroxy acetophenoximes.

By "adjacent atoms," we mean atoms directly bonded together. By the term "alkyl" we mean a saturated aliphatic hydrocarbon group containing no aromatic rings. By "strongly acidic groups," we mean groups more strongly acidic than carboxylic acid groups.

By a "2-hydroxy aromatic oxime," we mean one in which the hydroxy group and the oxime, or

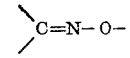

group are directly bonded to adjacent ring carbon atoms. By the term "2-hydroxyl aryl oxime," we intend to include only those in which R, except for the OH and

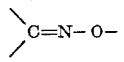

groups, consists of carbon and hydrogen. By the term "2-hydroxy phenyl oxime," we mean those of the benzene series containing only one benzene ring.

The ketoximes are preferably mixed alkyl-2-hydroxy-aryl ketoximes, in which the alkyl group contains up to 6 carbon atoms. By the terms "mixed aliphatic-aromatic ketoxime" and "mixed alkyl-aryl ketoxime" we mean those in which one valence of the

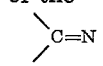

group is satisfied by an aliphatic or alkyl group and the other valence is satisfied by a ring carbon atom of a benzene ring in an aromatic or aryl group, as the case may be.

Among the compounds which we have found to be particularly effective are:

2-hydroxy-benzaldoxime

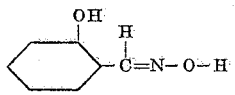

2-hydroxy-3,5-dibromo-benzaldoxime

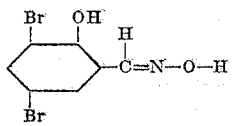

2-hydroxy-3-methoxy-benzaldoxime

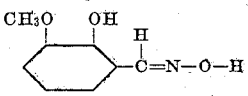

2,4-dihydroxy-benzaldoxime

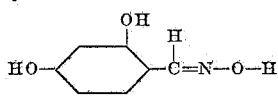

2-hydroxy-1-naphthaldoxime

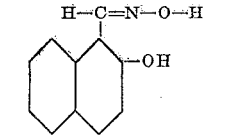

2-hydroxy-acetophenoxime

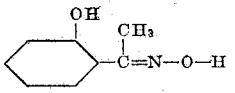

2-hydroxy-5-methyl-acetophenoxime

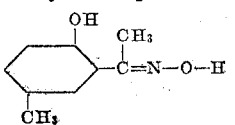

2-hydroxy-4-methyl-acetophenoxime

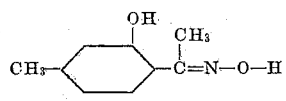

2,4-dihydroxy-acetophenoxime

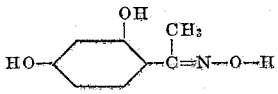

2-hydroxy-propiophenoxime

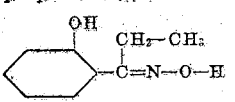

The quantity of copper deactivator added will be dependent upon the amount of copper present in the organic substance. At least two mols of copper deactivator must be added for each atom of copper in the organic substance. Preferably, from about 2.5 to 100 mols of copper deactivator is used for each atom of copper in the organic substance or from about 5 to about 10 times the weight of the copper present. From about 0.0002 to about 0.01% of copper deactivator, based on the organic substance, will generally be satisfactory in most organic substances where the copper or copper compound is accidentally present. Higher ratios of copper deactivator, up to the limit of solubility of the deactivator in the organic substance, may be used, particularly when the organic substance is in contact with metallic copper in bulk which forms a reservoir of copper ions.

In order to avoid confusion arising from a superabundance of data, cracked gasoline has been selected as an example of an auto-oxidizable organic substance for illustrating the present invention. The samples employed were commercial blends of cracked and straight-run gasolines, completely refined but otherwise untreated with chemical agents such as dyes, anti-knock agents and anti-oxidants. p-Benzylaminophenol, sometimes hereinafter referred to as BAP, has been chosen as the representative gasoline anti-oxidant. A representative copper catalyst is copper oleate. The concentrations of these materials as given in the following tables are given in weight percent in the gasoline, those for the copper catalyst being based on the content of copper rather than copper oleate.

The term "stabilized gasoline" is employed to denote gasoline to which has been added an anti-oxidant in sufficient quantity to significantly increase its induction period in the absence of added copper.

The method, used for determining the induction periods given below, was the accelerated method developed by Voorhees & Eisinger (S. A. E. J. 24, 584, 1929). It consists in heating 100 cc. of gasoline at 100° C. in a 1 liter Pyrex flask containing pure oxygen. The internal pressure is observed every 10 minutes by means of a manometer attached to the system. The elapsed time, from the start of the test until the gasoline begins to absorb oxygen at the rate of 10 cc. or more per 10 minutes, as shown by the fall in internal pressure, is taken as the induction period. It has been found that the induction period obtained by this method, although greatly shortened, is a fairly accurate measure of the relative stability of gasoline under normal storage conditions.

The magnitude of the catalytic effect is dependent upon the form of the copper as well as upon its concentration or the area of contact. The following substances were found to have readily measurable pro-oxidant effect: cupric chloride and oleate, metallic copper, cuprous and cupric oxides and cupric sulfide. Even Babbitt metal and aluminum alloys containing copper decrease the induction period of gasoline.

The presence of 0.1 part per million of soluble copper was detectable in a sample of unstabilized gasoline, while 1 p. p. m. decreased its induction period from 110 to 30 minutes.

The harmful effect of dissolved copper on gasoline stabilized with several different antioxidants is shown in Table I.

TABLE I

*The effect of dissolved copper*

| No. | Antioxidant | Conc. | Induction period in minutes | |
|---|---|---|---|---|
| | | | No added Cu | 1 P.P.M. Cu |
| 1 | None (control) | | 110 | 30 |
| 2 | Hardwood tar distillate | 0.025 | 260 | 60 |
| 3 | ----do---- | 0.10 | | 230 |
| 4 | Catechol | 0.008 | 270 | 80 |
| 5 | ----do---- | 0.025 | | 270 |
| 6 | Alpha-naphthol | 0.005 | 270 | 40 |
| 7 | ----do---- | 0.0175 | | 270 |
| 8 | p-Benzylaminophenol (BAP) | 0.001 | 270 | 45 |
| 9 | ----do---- | 0.0075 | | 110 |

It will be noted that the pro-oxidant effect of 1 p. p. m. of copper in the gasoline stabilized with the different antioxidants to 270 minutes induction period could only be overcome by the further addition of 7250 p. p. m. of hardwood tar distillate, 170 p. p. m. of catechol and 125 p. p. m. of alpha-naphthol, while it could not be overcome by the addition of 75 p. p. m. of BAP.

It is evident that the inhibiting effect of antioxidants is decreased by the copper and the method of overcoming the action of copper by the addition of larger amounts of antioxidants is not efficient. Even if the cost of additional antioxidant required be justified, other difficulties might arise due to the introduction of too much non-volatile matter into gasoline. The date presented in Table I must not be taken, however, to establish a fixed relative order of susceptibility of the antioxidants to copper. It has been found that the effect of copper varies in different samples of gasoline.

The effect of the addition of copper deactivators on a copper contaminated gasoline inhibited with BAP is shown in Table II.

TABLE II

*The effect of copper deactivators*

These data were obtained in a gasoline having the following properties:

Control (unstabilized)_____ 200 minutes induction period
Plus 0.002% BAP_____ 360 minutes induction period
Plus 0.002% BAP + 1 p. p. m. Cu___ 60 minutes induction period The deactivators were tested in this gasoline containing 0.002% BAP and 1 p. p. m. Cu.

| No. | Deactivator | Conc. deact. | Induction period |
|---|---|---|---|
|  |  | Weight, percent | Minutes |
| 1 | None | | 60 |
| 2 | 2-hydroxy-benzaldoxime | 0.002 | 340 |
| 3 | 2-hydroxy-3-5-dibromo-benzaldoxime | 0.002 | 300 |
| 4 | 2-hydroxy-3-methoxy-benzaldoxime | 0.002 | 340 |
| 5 | 2,4-dihydroxy-benzaldoxime | 0.002 | 350 |
| 6 | 2-hydroxy-1-naphthaldoxime | 0.003 | 330 |
| 7 | 2-hydroxy-acetophenoxime | 0.002 | 310 |
| 8 | 2-hydroxy-5-methyl-acetophenoxime | 0.002 | 280 |
| 9 | 2-hydroxy-(mixed 4 and 5)-methyl-acetophenoxime | 0.002 | 280 |
| 10 | 2,4-dihydroxy-acetophenoxime | 0.002 | 310 |
| 11 | 2-hydroxy-propiophenoxime | 0.002 | 260 |

It will be noted that the deactivators suppress the catalytic action of copper and permit BAP to function again as an antioxidant, and that the aldoximes are the most effective.

The copper deactivators do not possess true antioxidant effect. They do not increase the induction period of unstabilized gasoline and merely restore that of unstabilized gasoline, contaminated with copper, to the value it would have if it were not contaminated.

Since the function of the deactivators is to suppress the catalytic activity of a given quantity of copper, an excess, beyond that required for complete deactivation, is superfluous except that it renders the product more resistant for further copper contamination.

This class of copper deactivators has been characterized in a particular manner since all oximes are not effective. The following compounds were found to have no, or so little, effect as to be inadmissible in the same class: isofenchonoxime, 3-hydroxybenzaldoxime, 4-hydroxy-benzaldoxime, acetophenoxime, and furfuraldoxime. This appears to be due to the absence of the hydroxyl group in the ring adjacent to the oxime group.

The copper deactivators, belonging to the class covered by our invention, are readily prepared by treating the corresponding aldehydes or ketones with hydroxylamine in water or in some other solvent, such as methanol or alcohol. The general methods of preparing them are well known and are described in the literature. The solubility of most of them in organic substances is sufficiently high for them to be readily incorporated.

Unlike true antioxidants they are resistant to the action of molecular oxygen, and solutions of the deactivators may be kept in the presence of air for years without any apparent change. They are thermally stable but are destroyed by strong mineral acids.

The efficiencies of antioxidants other than benzylaminophenol are also improved in the presence of copper by the addition of a copper deactivator of our invention. Although the effect of the copper deactivator on the efficiency of benzylaminophenol only has been disclosed, similar results are obtainable with other antioxidants, such as other p-aminophenol derivatives, alpha naphthol, catechol, pyrogallol, mesitol, the xylenols, p-hydroxyphenyl morpholine and hardwood-tar distillate. They have been used with catechol, dibenzyl aminophenol, iso-propyl N-methyl aminophenol, iso-propyl N-dimethyl aminophenol, n-butyl aminophenol, iso-butyl aminophenol, o-aminophenol and p-aminophenol. There is no reason to believe that any true antioxidant would fail to respond to this treatment.

The deactivators may be added in any form and manner to the oxidizable products to be protected. They may be in solid or liquid form, mixed with other addition agents or dissolved in a solvent. Solvents may be employed to aid in the incorporation of the deactivators into the organic substances where desired. The deactivators may be added to the finished products or to the products at any stage in the process of manufacture.

While we have disclosed tests illustrating the effect of our copper deactivators in cracked gasoline, these copper deactivators have been tested and found to be quite effective for suppressing the deleterious effect of copper and its salts in rubber, petroleum lubricating oils, fruit juices, alcoholic mannite solutions and castor oil. We have also found copper deactivators to be effective in straight-run gasolines, motor benzol, fuel oils, heating oils, animal fats and oils, vegetable fats and oils, edible oils, drying oils, soaps, photographic developers, gasoline antioxidants and vegetable juices. It is merely necessary to employ a copper deactivator which is soluble in the organic substance to be protected, avoiding conditions such as the presence of substantial amounts of strong mineral acids which would destroy the copper deactivator. Accordingly, our copper deactivators will be found to be effective in petroleum products and mineral hydrocarbons such as gasoline, kerosene, fuel oil, transformer oil, lubricating oil and the like; fats, waxes; animal and vegetable fats and oils, and derivatives obtained therefrom, such as soaps; sulfonated and sulfated oils, including alcohol sulfates; fruit and vegetable juices; essential oils; perfumes; cotton; silks; paper; wool; cellulose acetate; regenerated cellulose products; synthetic products, such as photographic developers, antioxidants, and conjugated dienes and their polymerization products, particularly chloroprene, "neoprene" and "Neoprene" latex. The deactivators also function in solutions of such organic substances in different solvents, as well as in mixtures of such substances.

Our compounds cannot be assigned to specific classes of organic products as can be done with the different types of antioxidants. So long as the organic substance does not have a high mineral acid content destructive to the deactivator, the deactivator, upon solution in the organic substance will be effective to suppress the catalytic activity of copper present and hence our compounds will be operative in different classes of oxidizable organic substances.

Mixtures of deactivators may be used. Besides many others, the following compounds are copper deactivators:

2-hydroxy-5-chloro-benzaldoxime
2-hydroxy-3-nitro-benzaldoxime
2-hydroxy-6-methyl-benzaldoxime
2-hydroxy-5-methoxy-benzaldoxime
2,6-dihydroxy-benzaldoxime
2-hydroxy-3-cyano-benzaldoxime
2-hydroxy-3-carboxy-benzaldoxime
1-hydroxy-2-naphthaldoxime
Anthrol-2-aldoxime-1
2-hydroxyfluorene-aldoxime-1
4-hydroxydiphenyl-aldoxime-3
3-hydroxyphenanthrene-aldoxime-4
1,3-dihydroxy-2,4-dialdoximebenzene
2-hydroxy-5-chloro-acetophenoxime
2-hydroxy-butyrophenoxime
2-hydroxybenzophenoxime
2,4-diacetyl resorcinol dioxime
1,2-dihydroxy anthraquinone dioxime
Salicylaldoxime phenyl ether
Acetyl salicylaldoxime
2-hydroxy-5-methyl-acetophenoxime methyl ether
Benzoyl-2-hydroxy-5-methyl-acetophenoxime
2-hydroxy-5-methyl-benzophenoxime benzyl ether
2-hydroxy-5-methyl-benzaldoxime methyl ether The copper deactivators may be used in organic products containing other adjuvants, such as accelerators and softening agents in rubber, tetraethyl lead and dyes in gasoline, perfumes in soap, flavoring agents in fats and oils, and extreme pressure lubricants and anti-sludging agents in lubricating oil.

From all of the above, it will be apparent that, by our invention, we have made it possible to stabilize many organic substances, susceptible to the harmful action of oxygen catalyzed by copper and its compounds, by the addition of one or more members of a class of compounds which suppress the harmful activity of the copper and its compounds. We have shown that the deactivator is effective alone or in combination with an amount of an antioxidant which is generally required to stabilize the products in the absence of copper. Thus, we have made it possible to effectively and economically stabilize organic substances by means of antioxidants even in the presence of copper and its compounds without it being necessary to employ large amounts of antioxidant to overcome the catalytic action of the copper.

While we have disclosed the preferred embodiments of our invention and the preferred modes of carrying the same into effect, it will be readily apparent to those skilled in the art that many variations and modifications may be made therein without departing from the spirit of our invention. Accordingly the scope of our invention is not to be limited to the particular embodiments specifically disclosed but only by the appended claims and the prior art.

We claim:

1. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic oxime compound free of strongly acidic groups.

2. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic oxime free of strongly acidic groups.

3. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic oxime compound which, except for the nitrogen of the oxime group, consists of carbon, hydrogen and oxygen.

4. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic oxime which, except for hydroxy groups and the =N—O—H group, consists of carbon and hydrogen.

5. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic oxime of the benzene series free of strongly acidic groups.

6. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an unsubstituted o-hydroxy aryl oxime.

7. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic aldoxime free of strongly acidic groups.

8. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an orthohydroxy aryl aldoxime.

9. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being 2-hydroxy benzaldoxime.

10. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic ketoxime free of strongly acidic groups.

11. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being an o-hydroxy aromatic ketoxime of the benzene series free of strongly acidic groups.

12. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being a mixed alkyl-o-hydroxy aryl ketoxime of the benzene series.

13. A composition comprising an organic substance, normally subject to deterioration caused by oxygen, containing a catalyst of the group consisting of copper and its compounds, normally effective to catalyze oxidation of said organic substance, and having incorporated therein a copper deactivator in a small proportion sufficient to deactivate said catalyst, said copper deactivator being 2-hydroxy acetophenoxime.

14. A composition comprising petroleum hydrocarbons, normally subject to deterioration caused by oxygen, containing a catalyst of the group consisting of copper and its compounds, normally effective to catalyze oxidation of said petroleum hydrocarbons, and having incorporated therein a copper deactivator in a small proportion sufficient to deactivate said catalyst, said copper deactivator being an o-hydroxy aromatic oxime compound free of strongly acidic groups.

15. A composition comprising petroleum hydrocarbons, normally subject to deterioration caused by oxygen, containing a catalyst of the group consisting of copper and its compounds, normally effective to catalyze oxidation of said pertoleum hydrocarbons, and having incorporated therein a copper deactivator in a small proportion sufficient to deactivate said catalyst, said copper deactivator being an o-hydroxy aromatic oxime which, except for hydroxy groups and the =N—O—H group, consists of carbon and hydrogen.

16. A composition comprising petroleum hydrocarbons, normally subject to deterioration caused by oxygen, containing a catalyst of the group consisting of copper and its compounds, normally effective to catalyze oxidation of said petroleum hydrocarbons, and having incorporated therein a copper deactivator in a small proportion sufficient to deactivate said catalyst, said copper deactivator being an o-hydroxy aryl oxime.

17. A composition comprising petroleum hydrocarbons, normally subject to deterioration caused by oxygen, containing a catalyst of the group consisting of copper and its compounds, normally effective to catalyze oxidation of said petroleum hydrocarbons, and having incorporated therein a copper deactivator in a small proportion sufficient to deactivate said catalyst, said copper deactivator being an ortho hydroxy aryl aldoxime.

18. A composition comprising petroleum hydrocarbons, normally subject to deterioration caused by oxygen, containing a catalyst of the group consisting of copper and its compounds, normally effective to catalyze oxidation of said petroleum hydrocarbons, and having incorporated therein a copper deactivator in a small proportion sufficient to deactive said catalyst, said copper deactivator being 2-hydroxy-benzaldoxime.

19. A composition comprising petroleum hydrocarbons, normally subject to deterioration caused by oxygen, containing a catalyst of the group consisting of copper and its compounds, normally effective to catalyze oxidation of said petroleum hydrocarbons, and having incorporated therein a copper deactivator in a small proportion sufficient to deactivate said catalyst, said copper deactivator being an o-hydroxy aromatic ketoxime free of strongly acidic groups.

20. A composition comprising petroleum hydrocarbons, normally subject to deterioration caused by oxygen, containing a catalyst of the group consisting of copper and its compounds, normally effective to catalyze oxidation of said petroleum hydrocarbons, and having incorporated therein a copper deactivator in a small proportion sufficient to deactivate said catalyst, said copper deactivator being a mixed alkyl -o-hydroxy-aryl ketoxime of the benzene series.

21. A composition comprising an organic substance, normally subject to deterioration caused by oxygen, containing a catalyst of the group consisting of copper and its compounds, normally effective to catalyze oxidation of said organic substance, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an o-hydroxy aromatic oxime compound free of strongly acidic groups.

22. A composition comprising an organic substance, normally subject to deterioration caused by oxygen, containing a catalyst of the group consisting of copper and its compounds, normally effective to catalyze oxidation of said organic substance, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an o-hydroxy aromatic oxime which, except for hydroxy groups and the =N—O—H group, consists of carbon and hydrogen.

23. A composition comprising an organic substance, normally subject to deterioration caused by oxygen, containing a catalyst of the group consisting of copper and its compounds, normally effective to catalyze oxidation of said organic substance, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an ortho-hydroxy aryl aldoxime.

24. A composition comprising an organic substance, normally subject to deterioration caused by oxygen, containing a catalyst of the group consisting of copper and its compounds, normally effective to catalyze oxidation of said organic substance, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being 2-hydroxy-benzaldoxime.

25. A composition comprising an organic substance, normally subject to deterioration caused by oxygen, containing a catalyst of the group consisting of copper and its compounds, normally effective to catalyze oxidation of said organic substance, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an o-hydroxy aromatic ketoxime free of strongly acidic groups.

26. A composition comprising an organic substance, normally subject to deterioration caused by oxygen, containing a catalyst of the group consisting of copper and its compounds, normally effective to catalyze oxidation of said organic substance, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being a mixed alkyl-o-hydroxy-aryl ketoxime of the benzene series.

27. A composition comprising an organic substance, normally subject to deterioration caused by oxygen, containing a catalyst of the group consisting of copper and its compounds, normally effective to catalyze oxidation of said organic substance, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being 2-hydroxy acetophenoxime.

28. A composition comprising petroleum hydrocarbons, normally subject to deterioration caused by oxygen, containing a catalyst of the group consisting of copper and its compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an o-hydroxy aromatic oxime compound free of strongly acidic groups.

29. A composition comprising petroleum hydrocarbons, normally subject to deterioration caused by oxygen, containing a catalyst of the group consisting of copper and its compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an o-hydroxy aryl oxime.

30. A composition comprising petroleum hydrocarbons, normally subject to deterioration caused by oxygen, containing a catalyst of the group consisting of copper and its compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an ortho-hydroxy aryl aldoxime.

31. A composition comprising petroleum hydrocarbons, normally subject to deterioration caused by oxygen, containing a catalyst of the group consisting of copper and its compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being 2-hydroxy-benzaldoxime.

32. A composition comprising petroleum hydrocarbons, normally subject to deterioration caused by oxygen, containing a catalyst of the group consisting of copper and its compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an o-hydroxy aromatic ketoxime free of strongly acidic groups.

33. A composition comprising petroleum hydrocarbons, normally subject to deterioration caused by oxygen, containing a catalyst of the group consisting of copper and its compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being a mixed alkyl -o-hydroxy aryl ketoxime of the benzene series.

34. A composition comprising petroleum hydrocarbons, normally subject to deterioration caused by oxygen, containing a catalyst of the group consisting of copper and its compounds, normally effective to catalyze oxidation of said petroleum hydrocarbons, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being 2-hydroxy acetophenoxime.

35. A composition comprising gasoline, normally subject to deterioration caused by oxygen, containing a catalyst of the group consisting of copper and its compounds, normally effective to catalyze oxidation of said gasoline, and having incorporated therein a copper deactivator in a small proportion sufficient to deactivate said catalyst, said copper deactivator being an o-hydroxy aromatic oxime compound free of strongly acidic groups.

36. A composition comprising gasoline, normally subject to deterioration caused by oxygen, containing a catalyst of the group consisting of copper and its compounds, normally effective to catalyze oxidation of said gasoline, a small proportion of an antioxidant, normally effective to materially retard such deterioration in the absence of said catalyst but which is less effective in the presence of said catalyst, and having incorporated therein a copper deactivator in a small proportion sufficient to deactivate said catalyst, said copper deactivator being an o-hydroxy aromatic oxime compound free of strongly acidic groups.

FREDERICK B. DOWNING.
CHARLES J. PEDERSEN.